United States Patent
Murphy et al.

(10) Patent No.: US 10,550,704 B2
(45) Date of Patent: Feb. 4, 2020

(54) HIGH PERFORMANCE CONVERGENT DIVERGENT NOZZLE

(71) Applicant: United Technologies Corporation, Hartford, CT (US)

(72) Inventors: Michael Joseph Murphy, Windsor, CT (US); Oleg Petrenko, Danbury, CT (US)

(73) Assignee: United Technologies Corporation, Farmington, CT (US)

( * ) Notice: Subject to any disclaimer, the term of this patent is extended or adjusted under 35 U.S.C. 154(b) by 318 days.

(21) Appl. No.: 14/911,889

(22) PCT Filed: Aug. 22, 2014

(86) PCT No.: PCT/US2014/052225
§ 371 (c)(1),
(2) Date: Feb. 12, 2016

(87) PCT Pub. No.: WO2015/027131
PCT Pub. Date: Feb. 26, 2015

(65) Prior Publication Data
US 2016/0194968 A1 Jul. 7, 2016

Related U.S. Application Data

(60) Provisional application No. 61/869,271, filed on Aug. 23, 2013.

(51) Int. Cl.
*F02K 1/82* (2006.01)
*F01D 9/02* (2006.01)
(Continued)

(52) U.S. Cl.
CPC ............... *F01D 9/02* (2013.01); *F01D 25/24* (2013.01); *F02C 3/04* (2013.01); *F02C 7/36* (2013.01);
(Continued)

(58) Field of Classification Search
CPC ... F01D 25/24; F02C 7/36; F02K 1/00; F02K 1/78; F02K 1/82; F02K 3/04; F02K 3/06; F05D 2260/40311; F05D 2240/128
See application file for complete search history.

(56) References Cited

U.S. PATENT DOCUMENTS 3,060,679 A * 10/1962 Schmitt ..................... F02K 3/11
415/147
3,261,164 A * 7/1966 Tumicki ..................... F02K 1/06
239/265.37

(Continued)

FOREIGN PATENT DOCUMENTS

DE 10017040 A1 10/2001

OTHER PUBLICATIONS

Quintao, Karla, "Design Optimization of Nozzle Shapes for Maximum Uniformity of Exit Flow", Nov. 9, 2012, FIU Electronic Theses and Dissertations.*

(Continued)

*Primary Examiner* — Steven M Sutherland
(74) *Attorney, Agent, or Firm* — Carlson, Gaskey & Olds, P.C.

(57) ABSTRACT

A turbofan engine includes a fan section. A core engine section drives the fan section. An outer nacelle surrounds the fan section and defines a radially outer surface of a fan duct. An inner nacelle surrounds the core engine section and defines a radially inner surface of the fan duct. A nozzle is disposed at a terminal end of the outer nacelle that defines an exit area for bypass air flow through the fan duct. The nozzle includes a convergent portion forward of a divergent portion and a turning angle for the divergent portion greater than about 12 degrees. A nacelle assembly and method are also disclosed.

14 Claims, 4 Drawing Sheets

(51) Int. Cl.
*F02K 1/78* (2006.01)
*F01D 25/24* (2006.01)
*F02C 3/04* (2006.01)
*F02C 7/36* (2006.01)
*F02K 3/04* (2006.01)

(52) U.S. Cl.
CPC .......... *F02K 1/78* (2013.01); *F02K 1/82* (2013.01); *F02K 3/04* (2013.01); *F05D 2220/36* (2013.01); *F05D 2240/128* (2013.01); *F05D 2240/24* (2013.01); *F05D 2240/35* (2013.01); *F05D 2260/40311* (2013.01)

(56) References Cited

U.S. PATENT DOCUMENTS

| | | | |
|---|---|---|---|
| 3,896,615 | A | 7/1975 | Slatkin et al. |
| 3,931,708 | A * | 1/1976 | Motycka ............... F02K 1/1207 239/265.33 |
| 4,137,708 | A * | 2/1979 | Aspinwall ................. F02K 7/16 60/204 |
| 4,587,806 | A | 5/1986 | Madden |
| 5,102,050 | A | 4/1992 | Sedziol et al. |
| 5,232,158 | A | 8/1993 | Barcza |
| 5,794,432 | A * | 8/1998 | Dunbar ................. F01D 17/162 60/204 |
| 5,833,140 | A | 11/1998 | Loffredo et al. |
| 7,377,099 | B2 | 5/2008 | Cowan et al. |
| 7,874,160 | B2 | 1/2011 | Swanson et al. |
| 8,127,532 | B2 | 3/2012 | Howe |
| 8,365,515 | B2 | 2/2013 | Migliaro, Jr. |
| 8,549,834 | B2 | 10/2013 | Do et al. |
| 2004/0006969 | A1 | 1/2004 | Whurr |
| 2006/0130456 | A1* | 6/2006 | Suciu ...................... F01D 5/066 60/226.1 |
| 2009/0071164 | A1 | 3/2009 | Renggli |
| 2009/0097967 | A1 | 4/2009 | Smith et al. |
| 2010/0005778 | A1* | 1/2010 | Chaudhry ............. F02K 1/1207 60/226.3 |
| 2010/0170261 | A1 | 7/2010 | Stieger et al. |
| 2010/0242433 | A1 | 9/2010 | Prat et al. |
| 2012/0124965 | A1* | 5/2012 | Grabowski ............... F02C 9/20 60/226.3 |
| 2013/0098055 | A1* | 4/2013 | Kupratis ................ F02C 7/143 60/774 |
| 2013/0104521 | A1* | 5/2013 | Kupratis ................... F02C 9/52 60/204 |
| 2013/0104560 | A1* | 5/2013 | Kupratis ................ F02C 7/143 60/772 |
| 2013/0121824 | A1 | 5/2013 | Kupratis |
| 2014/0103141 | A1* | 4/2014 | Bjerkemo ............ F02K 1/1215 239/265.37 |
| 2015/0033747 | A1 | 2/2015 | Leyko et al. |

OTHER PUBLICATIONS

Extended European Search Report for EP Application No. 14838009.0 dated Jul. 19, 2016.
International Search Report and Written Opinion for International Application No. PCT/US2014/052225 dated Nov. 28, 2014.
International Preliminary Report on Patentability for International Application No. PCT/US2014/052225 dated Mar. 3, 2016.

* cited by examiner

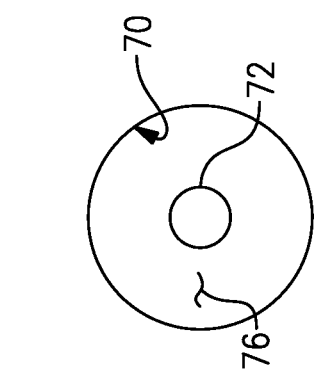
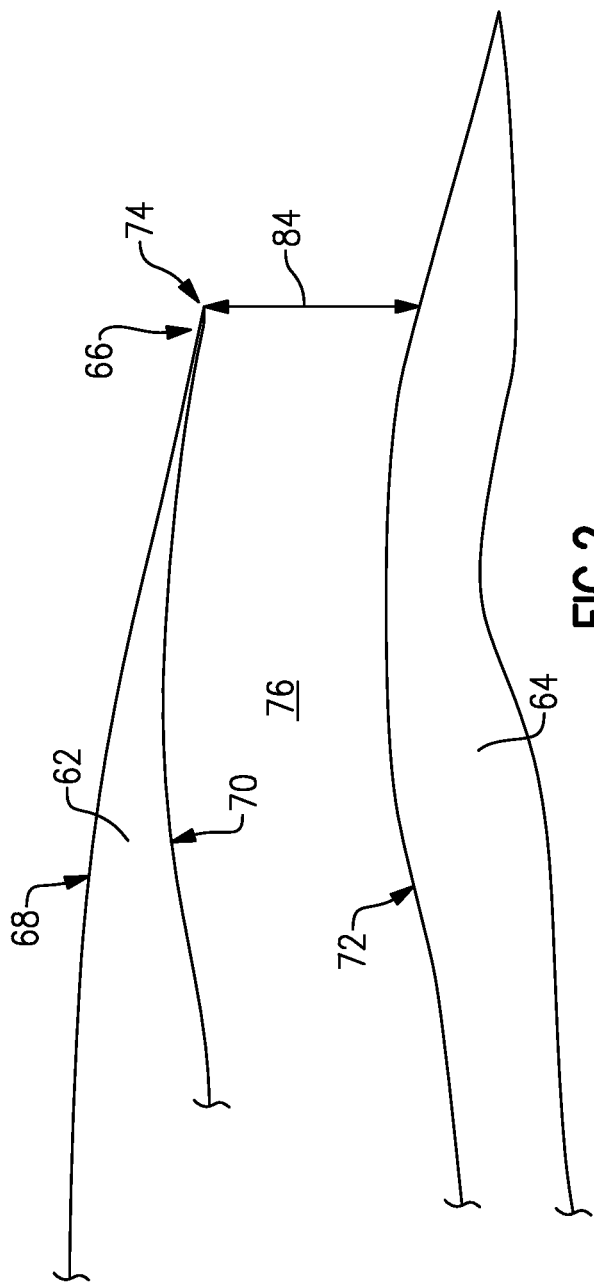
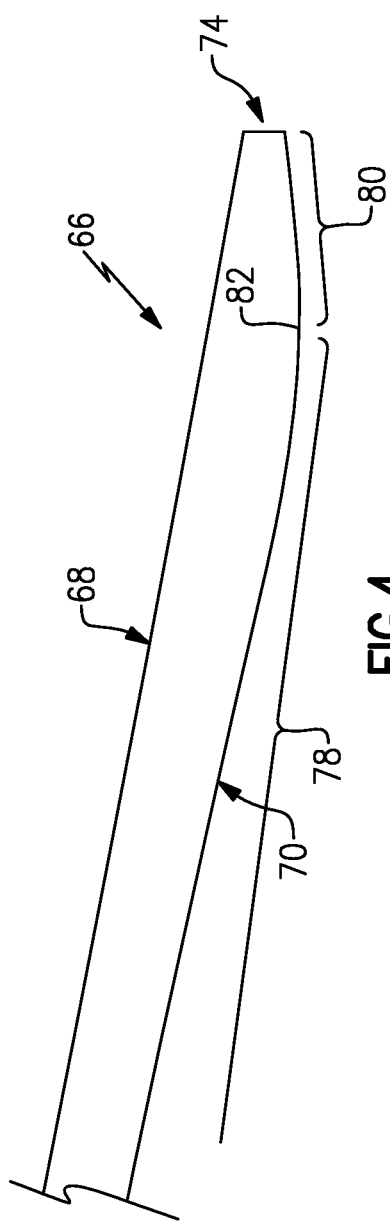

HIGH PERFORMANCE CONVERGENT DIVERGENT NOZZLE

CROSS REFERENCE TO RELATED APPLICATION

This application claims priority to U.S. Provisional Application No. 61/869,271 filed on Aug. 23, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

A significant amount of propulsive thrust is produced by bypass airflow through a bypass flow passage. The bypass flow passage is defined between an outer fan nacelle and an inner core nacelle. The outer nacelle includes an aft end portion that defines a fan nozzle. Low fan pressure engines typically need fan nozzle area growth at maximum take-off thrust conditions. Moreover, the fan nozzle is desired to provide a growth area at the maximum take-off thrust that manages fan flutter at the low fan pressures.

Although geared architectures have improved propulsive efficiency, turbine engine manufacturers continue to seek further improvements to engine performance including improvements to thermal, transfer and propulsive efficiencies.

SUMMARY

A turbofan engine according to an exemplary embodiment of this disclosure, among other possible things includes a fan section. A core engine section drives the fan section. An outer nacelle surrounds the fan section and defines a radially outer surface of a fan duct. An inner nacelle surrounds the core engine section and defines a radially inner surface of the fan duct. A nozzle is disposed at a terminal end of the outer nacelle that defines an exit area for bypass air flow through the fan duct. The nozzle includes a convergent portion forward of a divergent portion and a turning angle for the divergent portion greater than about 12 degrees.

In a further embodiment of the foregoing turbofan engine, the convergent portion defines a throat area and the divergent portion defines an exit area and a ratio of the exit area relative to the throat area is less than about 1.0025.

In a further embodiment of any of the foregoing turbofan engines, the throat area is an annular region defined at a transition point between the convergent portion and the divergent portion and the exit area is an annular region defined at the terminal end.

In a further embodiment of any of the foregoing turbofan engines, includes a transition point between the convergent portion and the divergent portion with a throat radius between about 3.25 and about 4.00 inches.

In a further embodiment of any of the foregoing turbofan engines, the divergent portion defines the terminal end of the outer nacelle.

In a further embodiment of any of the foregoing turbofan engines, the turning angle is between about 15 and about 25 degrees.

In a further embodiment of any of the foregoing turbofan engines, the turning angle is between about 18 and about 20 degrees.

In a further embodiment of any of the foregoing turbofan engines, the core engine includes a geared architecture for driving the fan section.

In a further embodiment of any of the foregoing turbofan engines, the fan duct is configured to provide a ratio of bypass airflow through the fan duct relative to airflow through the core engine section, and wherein the bypass ratio is greater than about six (6).

A nacelle assembly for a turbofan engine according to an exemplary embodiment of this disclosure, among other possible things includes an outer nacelle defining a radially outer surface of a fan duct. An inner nacelle defines a radially inner surface of the fan duct. A nozzle is disposed at a terminal end of the outer nacelle that defines an exit area for bypass air flow through the fan duct. The nozzle includes a convergent portion forward of a divergent portion and a turning angle for the divergent portion being greater than about 12 degrees.

In a further embodiment of the foregoing nacelle assembly, the convergent portion defines a throat area and the divergent portion defines an exit area and a ratio of the exit area relative to the throat area is less than about 1.0025.

In a further embodiment of any of the foregoing nacelle assemblies, the throat area is an annular region defined at a transition point between the convergent portion and the divergent portion and the exit area is an annular region defined at the terminal end.

In a further embodiment of any of the foregoing nacelle assemblies, includes a transition point between the convergent portion and the divergent portion with a throat radius between about 3.25 and about 4.00 inches.

In a further embodiment of any of the foregoing nacelle assemblies, the divergent portion defines a terminal end of the outer nacelle.

In a further embodiment of any of the foregoing nacelle assemblies, the turning angle is between about 15 and about 25 degrees.

In a further embodiment of any of the foregoing nacelle assemblies, the turning angle is between about 18 and about 20 degrees.

A method of controlling airflow exiting a fan duct according to an exemplary embodiment of this disclosure, among other possible things includes defining a throat area at an end of a convergent portion of a nozzle and an exit area at a terminal end of a divergent portion of the nozzle. A ratio of the exit area to the throat area is less than about 1.0025. A turning angle is defined for the divergent portion of the nozzle to be greater than about 12 degrees.

In a further embodiment of the foregoing method, includes the step of defining a throat radius between an outer nacelle surface and an inner nacelle surface to be between about 3.25 and about 4.00 inches.

In a further embodiment of any of the foregoing methods, includes defining the turning angle to be between about 18 and about 20 degrees.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is a schematic view of an exit area of an example fan duct.

FIG. 3 is a schematic end view of the example fan duct.

FIG. 4 is an enlarged view of an example nozzle of the example fan duct.

DETAILED DESCRIPTION

Figure 1:
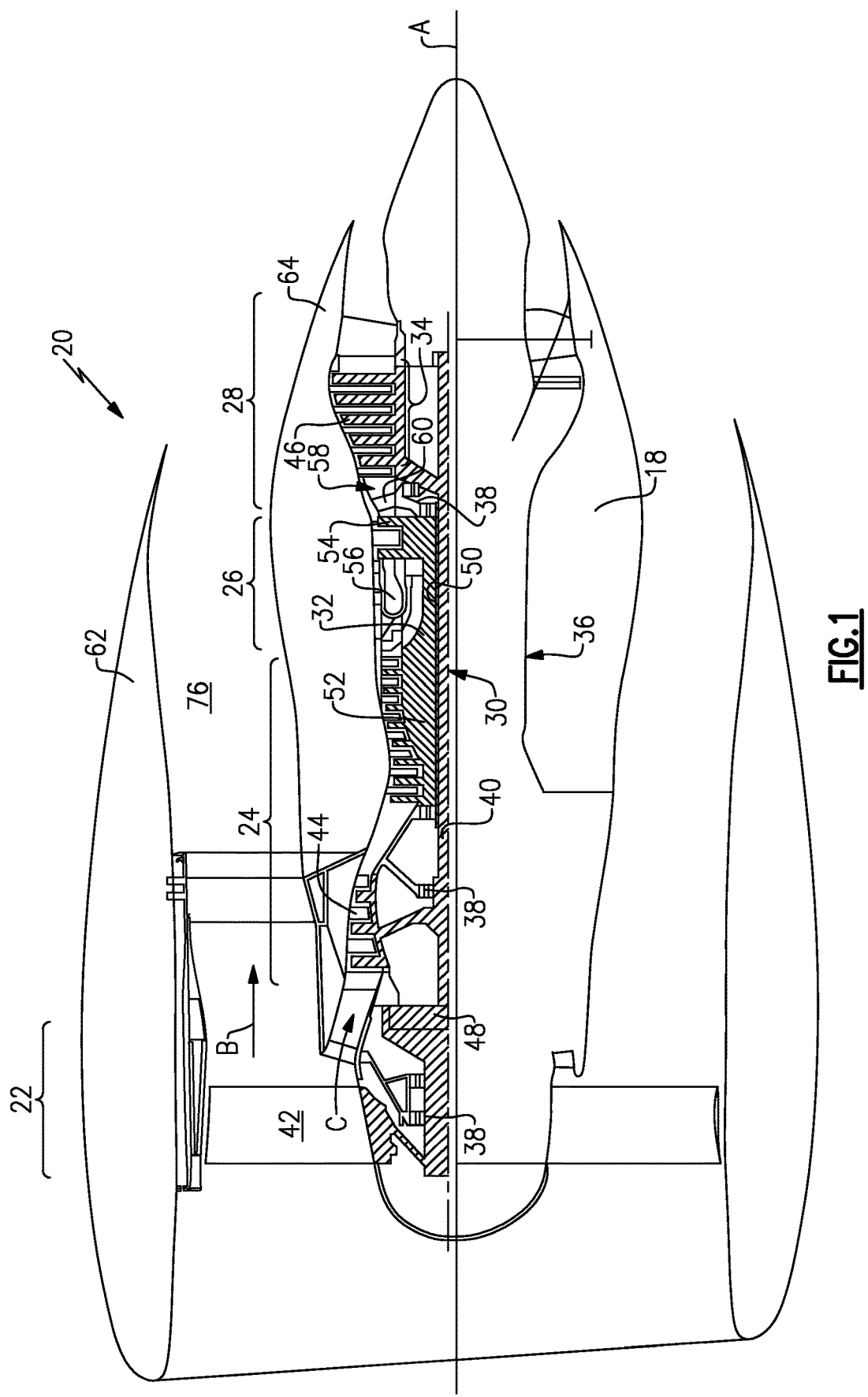
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass air flow path B through fan duct 76, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10.67 km). The flight condition of 0.8 Mach and 35,000 ft (10.67 km), with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]0.5$. The "Low corrected fan tip speed" as disclosed herein according to one non-limiting embodiment is less than about 1150 ft/second (350 m/second).

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Referring to FIGS. 2 and 3 with continued reference to FIG. 1, the fan duct 76 is defined between an outer nacelle 62 and a core nacelle 64. The core nacelle 64 defines a radially inner surface 72 of the fan duct 76 and the outer nacelle defined a radially outer surface 70.

The outer nacelle 62 terminates at a terminal end 74. The terminal end 74 includes a nozzle 66 that includes a specific geometry that provides improved performance and reduces shock waves at cruising speeds. The nozzle 66 defines an exit area 84. This exit area 84 is an annular area defined between the inner nacelle 64 and the outer nacelle 62.

Referring to FIG. 4 with continued reference to FIG. 2, the nozzle 66 includes the terminal end 74, a convergent portion 78, and a divergent portion 80 that is disposed aft of the converging portion 78. The diverging portion 80 of the nozzle 66 defines a terminal end 74 of the outer nacelle 62. The converging portion 78 extends aft to a transition point 82 where the diverging portion 80 begins and extends from the transition point 82 to the terminal end 74.

Figure 5:
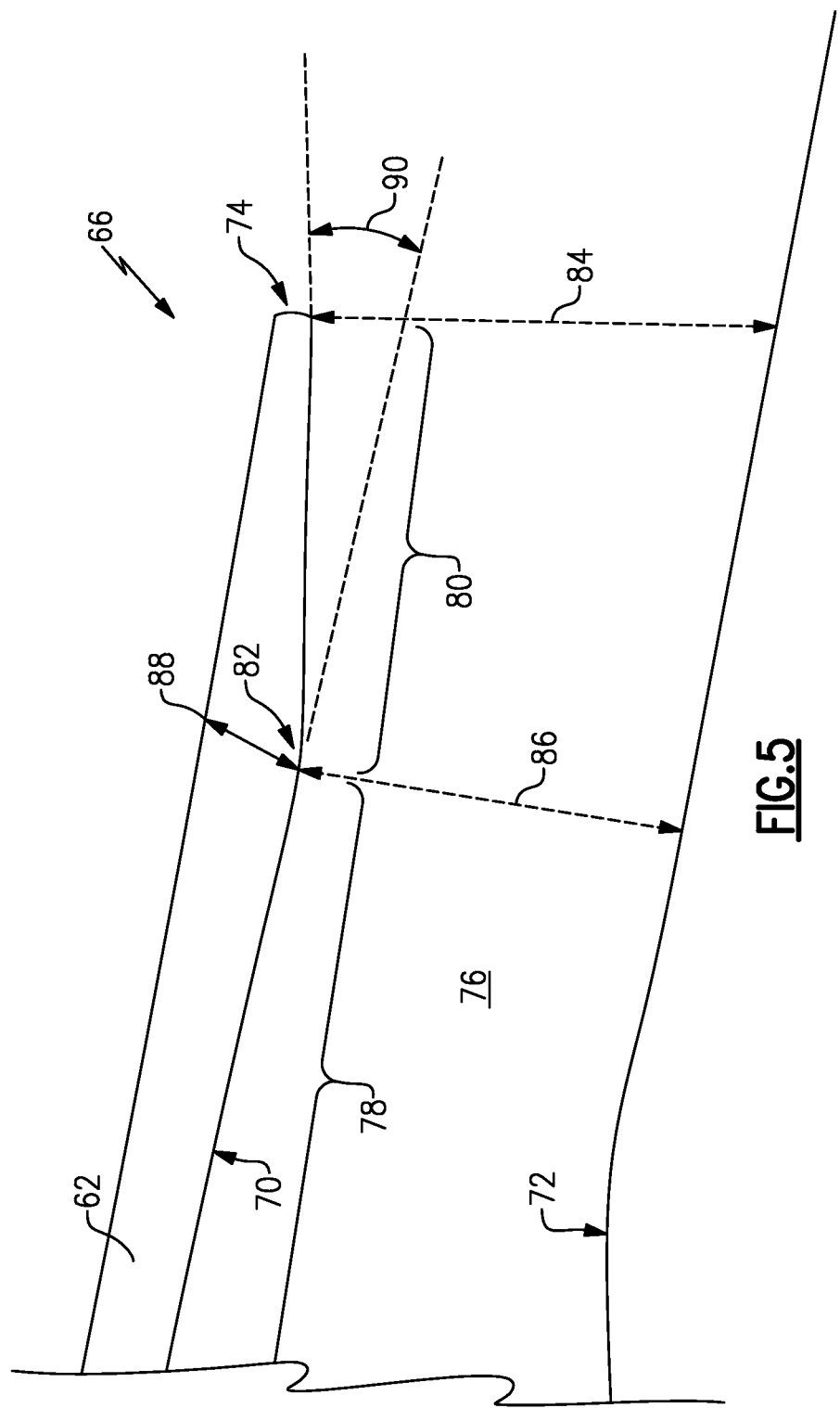
FIG. 5 is another enlarged view of the example nozzle.

Referring to FIG. 5 with continued reference to FIG. 2, the disclosed nozzle 66 includes the diverging portion 80 that is axially aft of the converging portion 78. The converging portion 78 ends at the transition point 82. At the transition point 82, a throat area 86 is defined between the outer radial surface 70 and the inner radial surface 72. The transition point 82 defines a throat radius 88 that is the distance between the outer radial surface 70 and the outer surface 68 of the outer nacelle near the terminal end 74.

The divergent portion 80 is defined from the transition point 82 to the terminal end 74. The divergent portion 80 is angled outwardly at a turning angle 90 from the transition point 82 and extending to the terminal end 74. The divergent portion 80 is disposed at the angle 90 the entire distance between the transition point 82 and the terminal end 74.

The example nozzle 66 includes a desired geometry that generates desired airflow characteristics of bypass airflow exiting the fan duct 76 at different air speeds and operating conditions. In this example, the divergent portion 80 is angled outwardly from the transition point 82 and angle 90. In this example, the angle 90 is greater than about 12 degrees. In another example, the angle 90 is in between 15 and 25 degrees. In yet another example embodiment, the angle is between 18 and 20 degrees and extends entirely from the transition point 82 to the terminal end 74. In another disclosed embodiment, the angle 90 is 19.9 degrees.

The convergent portion 78 and the divergent portion 80 define areas of airflow through the fan duct 76. The throat area 86 is defined between the inner surface 72 and the outer surface 70 at the transition point 82. The exit area 84 is defined at the terminal end 74 of the divergent portion 80. Both the throat area 86 and the exit area 84 are annular. (Schematically shown in FIG. 3) A ratio of the exit area 84 to the throat area 86 is in one disclosed embodiment less than about 1.0025. In another disclosed embodiment, the exit area is less than about 1.0020.

A distance between the outer radial surface 70 and the outer surface 68 of the outer nacelle 62 is indicated at 88 and is a portion of the nozzle configuration that aids in providing the desired performance. In this example, the distance 88 between the outer radial surface 70 and the outer surface 68 is between 3.25 and 4.0 inches. In another disclosed example, the distance 88 is 3.58 inches.

The combined features and structures that generate the nozzle geometry provide the desired performance operation of the nozzle 66 and airflow passing through the fan duct passage 76.

Figure 6:
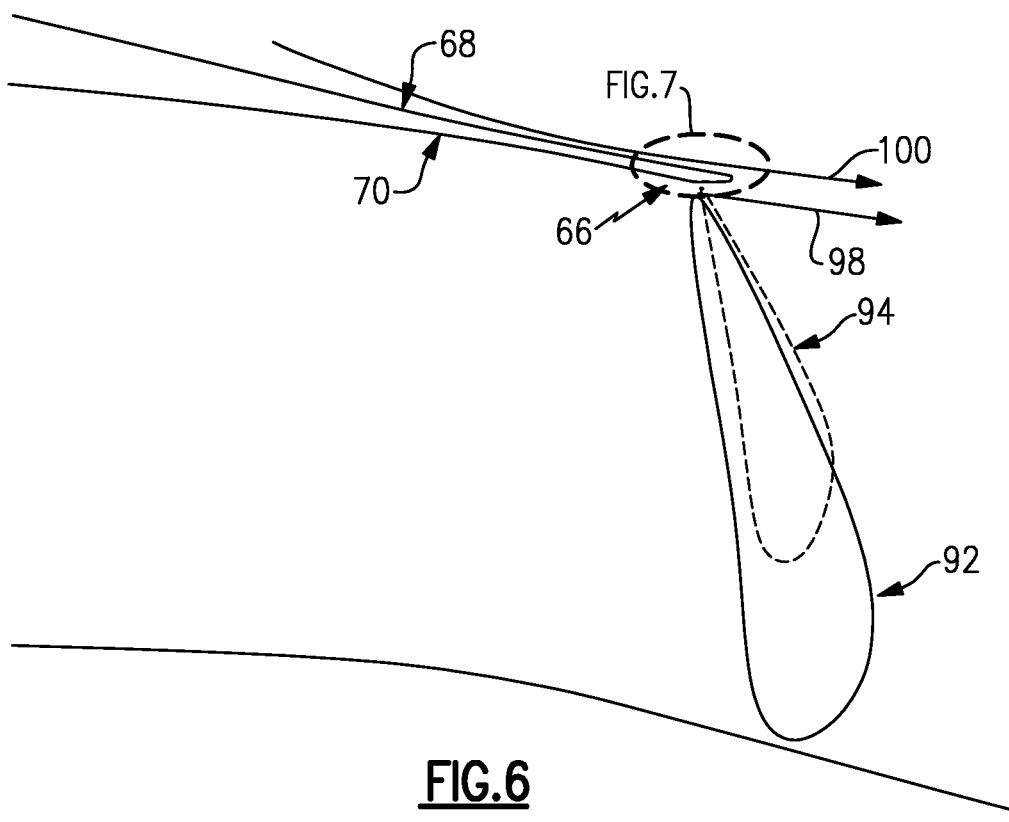
FIG. 6 is a schematic representation of flow generated for example nozzle configurations.

Referring to FIG. 6, supersonic flow 94 for the nozzle 66 is illustrated in contrast to a supersonic flow 92 generated by a conventional nozzle. In the conventional nozzle, the region of supersonic flow extends across the entire nozzle area. The example nozzle 66 reduces the region of supersonic flow to provide improved performance. The example nozzle 66 generates a smaller region of supersonic flow a typical cruise speeds to reduce the effective area ratio.

Figure 7:
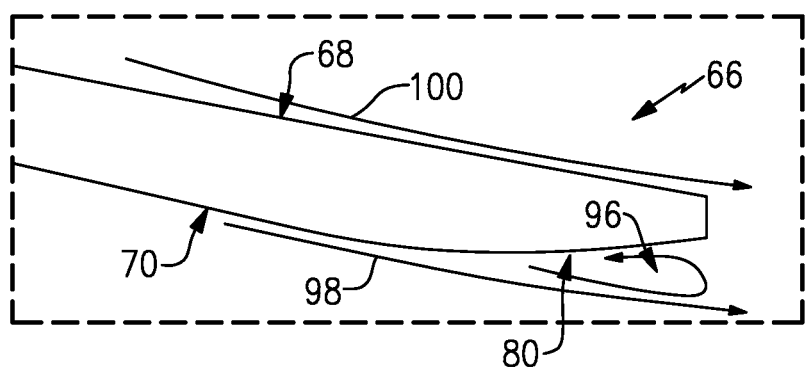
FIG. 7 is an enlarged schematic representation of flow generated for example nozzle configuration.

Referring to FIG. 7, with continued reference to FIG. 6, flow 100 over an exterior surface and flow 98 over an interior surface of the nozzle 66 are shown at a cruise condition. At the cruise condition the flow 98 separates from the interior surface as is shown at 96 from the divergent portion 80 of the nozzle 66. The separation indicated at 96 reduces the effective area of the nozzle 66 to provide the desired reduction in the region of supersonic flow indicated at 94 in FIG. 6.

The example nozzle 66 provides for airflow to remain attached to the outer surface 70 of the fan duct 76 at low pressure ratios, typically encountered at maximum takeoff operation allowing an increased amount of flow to pass thru the nozzle 66. At high nozzle pressure ratios, typical of the cruise design condition, the defined geometry of the nozzle 66 enables flow separation to form in the divergent portion 80. Enabling separation of flow in the divergent portion provides an effective reduction in area ratio that improves performance during cruise conditions. As appreciated, in an engine equipped with variable area nozzle, the terminal ends of the nozzle would be reduced during cruise conditions to improve airflow performance and provide an optimal thrust through the fan duct 76. The separation of flow from the outer surface 70 and the divergent portion 80 provides for the effective reduction of the exit area 84 to provide the beneficial thrust improvements without the mechanical requirements of a variable area fan nozzle.

The example convergent/divergent nozzle 66 includes a geometry that provides a high level of effective growth area that is desirable at maximum takeoff ("MTO") conditions for nozzles with low Fan Nozzle Pressure Ratio (FNPR) without impacting thrust performance at cruise conditions.

The example nozzle 66 provides a high level of cruise performance while eliminating the need for a mechanically operated variable area fan nozzle (VAFN) to provide area growth at MTO conditions. The resulting nozzle 66 provides a significant simplification of the system and reduction in weight.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbofan engine comprising;
an outer nacelle defining a radially outer surface of a fan duct;
an inner nacelle defining a radially inner surface of the fan duct; and
a fixed nozzle disposed at a terminal end of the outer nacelle that defines an exit area for bypass air flow through the fan duct, wherein the fixed nozzle includes a fixed convergent portion forward of a fixed divergent portion and a fixed turning angle for the fixed divergent portion being greater than 12 degrees, the fixed convergent portion extends to a transition point and the divergent portion begins at the transition point and extends uninterrupted to a terminal end of the outer nacelle at the fixed turning angle for the entire distance between the transition point and the terminal end of the outer nacelle, wherein a throat area is defined between the radially outer surface and the radially inner surface at the transition point and the fixed divergent portion defines the exit area between the radially outer surface and the radially inner surface at the terminal end of the outer nacelle and a ratio of the exit area relative to the throat area is less than 1.0025.

2. The turbofan engine as recited in claim 1, wherein the throat area is an annular region at the transition point and the exit area is an annular region defined at the terminal end.

3. The turbofan engine as recited in claim 1, wherein a throat radius is a distance between the outer radial surface and an outer surface of the outer nacelle, the throat radius being between 3.25 and 4.00 inches.

4. The turbofan engine as recited in claim 1, wherein the fixed turning angle is between 15 and 25 degrees.

5. The turbofan engine as recited in claim 1, wherein the fixed turning angle is between 18 and 20 degrees.

6. The turbofan engine as recited in claim 1, wherein a core engine section is disposed within the inner nacelle and includes a geared architecture for driving a fan section.

7. A nacelle assembly for a turbofan engine comprising;
an outer nacelle defining a radially outer surface of a fan duct;
an inner nacelle defining a radially inner surface of the fan duct; and
a fixed nozzle disposed at a terminal end of the outer nacelle that defines a fixed exit area for bypass air flow through the fan duct, wherein the fixed nozzle includes a fixed convergent portion forward of a fixed divergent portion and a fixed turning angle for the divergent portion being greater than 12 degrees, the fixed convergent portion extends to a transition point and the fixed divergent portion extends uninterrupted aft from the transition point to a terminal end of the outer nacelle at the fixed turning angle for the entire distance between the transition point and the terminal end of the outer nacelle, wherein a fixed throat area at the transition point between the radially outer surface and the radially inner surface of the fan duct and the fixed divergent portion defines the fixed exit area between the radially outer surface and the radially inner surface at the terminal end of the outer nacelle and a ratio of the fixed exit area relative to the throat area is less than 1.0025.

8. The nacelle assembly as recited in claim 7, wherein the throat area is an annular region defined at the transition point between the fixed convergent portion and the fixed divergent portion and the exit area is an annular region defined at the terminal end.

9. The nacelle assembly as recited in claim 8, including a throat radius defined at the transition point between the radially outer surface and the outer surface of the outer nacelle that is between 3.25 and 4.00 inches.

10. The nacelle assembly as recited in claim 7, wherein the fixed turning angle is between 15 and 25 degrees.

11. The nacelle assembly as recited in claim 7, wherein the fixed turning angle is between 18 and 20 degrees.

12. A method of controlling airflow exiting a fan duct comprising:
defining a fixed throat area at an end of a fixed convergent portion of a fixed nozzle and an exit area at a terminal end of a fixed divergent portion of the fixed nozzle, wherein a ratio of the exit area to the throat area is less than 1.0025, wherein the fixed throat area is disposed between surfaces of an outer nacelle and an inner nacelle; and
defining a fixed turning angle for the fixed divergent portion of the fixed nozzle to be greater than 12 degrees such that airflow along the fixed divergent portion separates to provide an effective reduction in an exit area without movement of the fixed divergent portion, wherein the fixed divergent portion begins at the end of the fixed convergent portion and extends uninterrupted at the fixed turning angle to the terminal end of the outer nacelle.

13. The method as recited in claim 12, including the step of defining a throat radius between an outer surface and an inner surface of an outer nacelle at transition point between the fixed convergent portion and the fixed divergent portion to be between 3.25 and 4.00 inches.

14. The method as recited in claim 12, including defining the fixed turning angle to be between 18 and 20 degrees.

* * * * *